March 14, 1950     R. E. FRITSCH     2,500,813
METHOD OF MAKING PIPE FITTINGS

Filed Sept. 25, 1947     3 Sheets-Sheet 1

INVENTOR.
Rudolph E. Fritsch
BY Arthur H. Robert
ATTORNEY

March 14, 1950     R. E. FRITSCH     2,500,813
METHOD OF MAKING PIPE FITTINGS
Filed Sept. 25, 1947     3 Sheets—Sheet 2
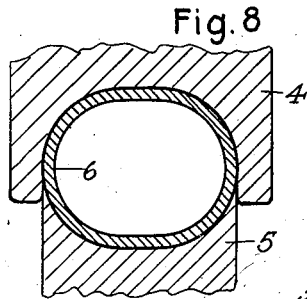
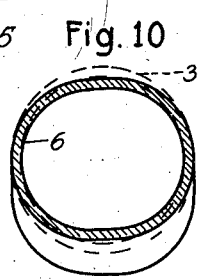
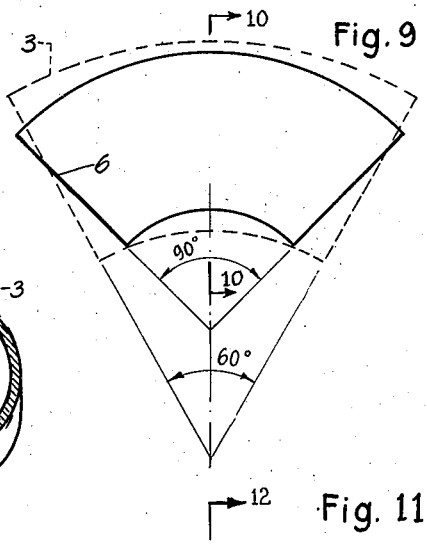
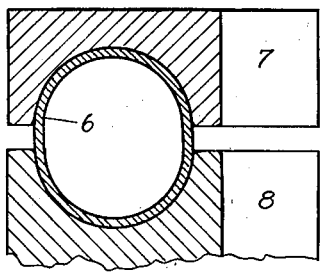
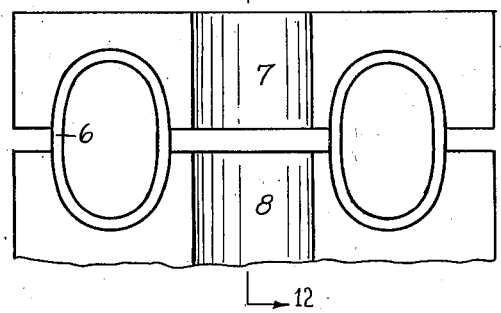
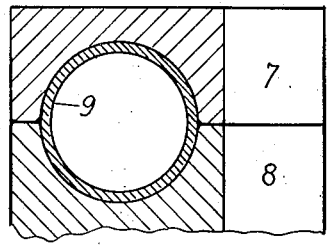
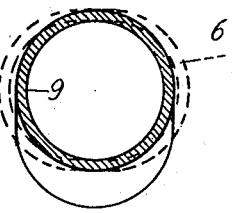
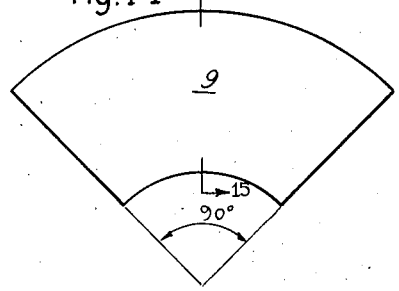
*INVENTOR.*
Rudolph E. Fritsch
BY *Arthur H. Robert*
*ATTORNEY*

March 14, 1950 R. E. FRITSCH 2,500,813
METHOD OF MAKING PIPE FITTINGS
Filed Sept. 25, 1947 3 Sheets-Sheet 3
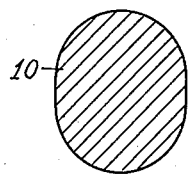
Fig. 16
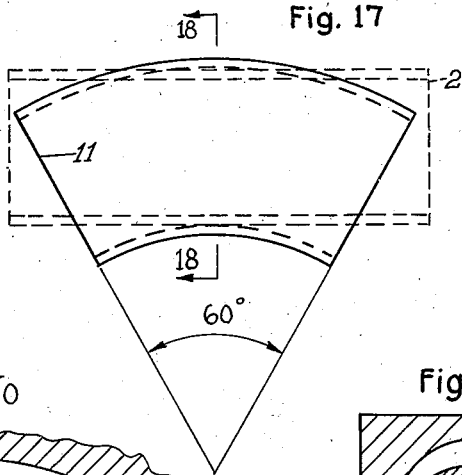
Fig. 17
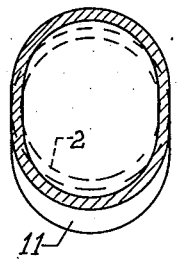
Fig. 18
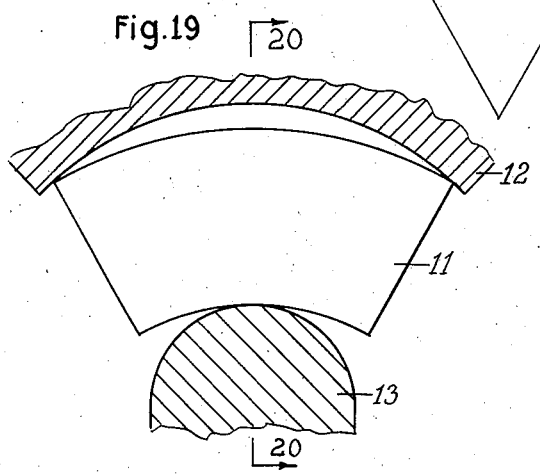
Fig. 19
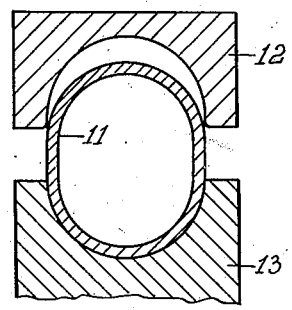
Fig. 20
Fig. 21
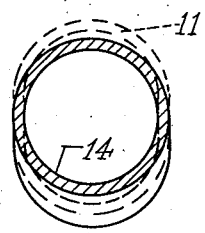
Fig. 22
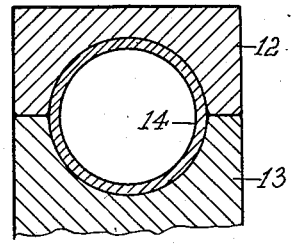
INVENTOR.
Rudolph E. Fritsch
BY
ATTORNEY Patented Mar. 14, 1950

2,500,813

UNITED STATES PATENT OFFICE 2,500,813

METHOD OF MAKING PIPE FITTINGS

Rudolph E. Fritsch, Louisville, Ky.

Application September 25, 1947, Serial No. 775,990

3 Claims. (Cl. 29—157)

In making curved pipe fittings, such as elbows, return bends and the like, the practice of one conventional method in large use today requires, for each fitting of a predetermined standard size, the following items:

A. A straight pipe stock of a predetermined smaller and special or non-standard size, e. g. a fitting of 2" nominal pipe size, and the conventional stock for it, have the following dimensions, where OD is the outside diameter, ID the inside diameter, WT the wall thickness and RC the radius of curvature:

|     | straight stock | curved fitting |
| --- | --- | --- |
|     | Inches | Inches |
| OD  | 1.775 | 2.375 |
| ID  | 1.467 | 2.067 |
| WT  | .154 | .154 |
| RC  | Infinite | 3.000 |

B. A curved expansion mandrel which ultimately curves along an arc having a radius equal to 1½ times the nominal pipe size of the fitting and which expands from an OD approximating, at the beginning of the curvature, the ID of the straight stock, to an OD approximating, at the end of the curvature, the ID of the curved fitting.

The steps employed in this conventional method are outlined hereinafter as follows:

1. heat the stock to a temperature 1300–1400° F.;
2. force the heated stock over the curved mandrel to expand and bend the stock to the dimensions and curvature desired in the final fitting, this operation usually causing the lead end of the stock to pull away from the outer side of the curved mandrel and thereby distort one open end of the fitting; and
3. correct the distortion of the open lead end to form the final fitting.

The conventional method has the advantage of compressing the inner curved side of the fitting to a predetermined shorter length, during the expanding and bending operation, and thus correspondingly strengthening that side of the fitting. While the method does not similarly compress the outer curved side of the fitting, the fact that it does not subject the outer curved side to tension, which would lengthen and correspondingly weaken that side, may be said to be an advantage.

Among the more objections of the conventional practice are: first, it increases the amount of stock inventory and the cost of the individual pieces of stock, because, for each fitting of standard size, i. e. standard diameter and the standard wall thickness for that diameter, it requires a non-standard stock having a smaller diameter than the fitting and a wall thickness which is oversize for that smaller diameter but of standard size for the diameter of the fitting; second, it requires the use of seamless stock since welded stock will weaken and even separate along the seam during the expanding operations; and third, it requires an extra final operation to correct the distortion at the lead end.

The principal objects of the present invention are to enhance the foregoing advantages of the conventional method and to overcome the foregoing objections without introducing other important objections.

Another important object of the invention is to provide a method which enables a fitting of standard size to be easily, quickly and inexpensively produced from straight stock of the same standard size thereby avoiding the necessity of stocking and using special sizes of stock and the cost incident thereto.

Another object of the invention is to subject a greater area of the stock to the beneficial effects of compression.

A further object is to provide a method which permits the use of welded stock.

A still further object is to provide a method which does not require a special operation to correct the distortion of the lead end of the stock.

I have found that these objectives may be attained by (a) bending the straight stock to an intermediate curvature less than the final curvature, (b) processing it to an oval cross section having a minor axis approximating the diameter of the straight stock, (c) bending the stock to the final curvature desired in the fitting, and (d) compressing it to the circular cross sectional area of the original stock. While these steps may be carried out in various operations, I propose to illustrate and describe a preferred method involving three operations and another method involving two operations.

In the preferred method, the stock is (1) bent to the intermediate curvature and simultaneously expanded to a circular cross section of greater area than the circular cross section of the original stock, (2) bent to the final curvature and simultaneously compressed in one direction to an oval cross section, the minor axis of which is located in the plane of the bend and reduced to the diameter of the original stock, and (3) finally compressed to the circular cross sectional area of the original stock.

In the second method, the stock is (1) bent to the intermediate curvature and simultaneously expanded to an oval cross section, the minor axis of which is perpendicular to the plane of the bend and equal to or held at the diameter of the original stock and (2) bent to the final curvature and simultaneously compressed to the circular cross sectional area of the original stock.

FIRST METHOD DRAWINGS

The preferred method of carrying out my invention utilizes a curved mandrel which expands from a standard circular cross section to a larger circular cross section. This method is illustrated in Figures 1–15 wherein:

FIRST OPERATION

Figure 1 is a side view of a curved mandrel, circular in cross section, over which the stock is passed in carrying out the first operation of my method;

Figures 2 and 3 are sections along lines 2—2 and 3—3 respectively of Figure 1;

SECOND OPERATION

Figure 6:
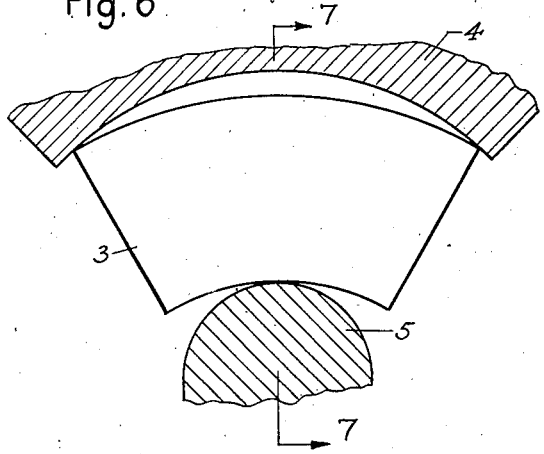
Figure 7:
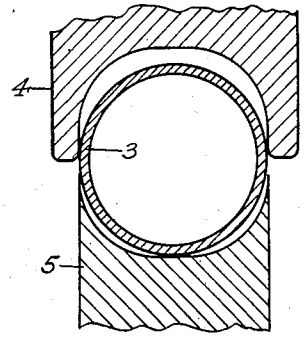

Figures 6 and 7 are vertical sectional views respectively taken longitudinally and transversely through the center of the dies used to perform the second operation, the dies being shown in the position at which they first engage the intermediately curved stock of large circular cross section, the plane of the bend being vertical;

Figure 8 corresponds to Figure 7 but shows the dies in the position which they assume when brought together to perform the second operation.

Figure 9 is a side view showing the intermediately curved stock, of large circular cross section in dotted lines as it appears in Figures 4–7, and the finally curved stock, of large oval cross section, in full lines as it appears in Figure 8, the plane of the bend of the curved stock being vertical;

Figure 10 is a section along line 10—10 of Figure 9;

THIRD OPERATION

Figures 11 and 12 respectively comprise a side elevational view of the dies used to perform the third operation and a transverse sectional view along line 12—12 of Figure 11, the dies being shown in both figures in the position at which they first engage the finally curved stock of large oval cross section, the plane of the bend being horizontal;

Figure 13 corresponds to Figure 12 but shows the dies in the position which they assume when brought together to perform the third operation;

Figure 14 is a side elevational view showing the finally curved stock of large oval cross section as it appears before the third operation when viewed from the side with the plane of the bend vertical, the view being identical with the corresponding view of the finally curved fitting of standard circular cross section after the third operation; and Figure 15 is a section along line 15—15 of Figure 14 but showing the finally curved stock of large oval cross section in dotted lines as it appears before the third operation and the finally curved fitting of standard circular cross section in full lines.

SECOND METHOD DRAWINGS

The second method above-mentioned for carrying out my invention utilizes a curved mandrel which expands from a standard circular cross section to a larger oval cross section. This method is illustrated in Figures 16–22 with the plane of the bend of the curved stock always vertical. These figures follow:

FIRST OPERATION

Figure 1:
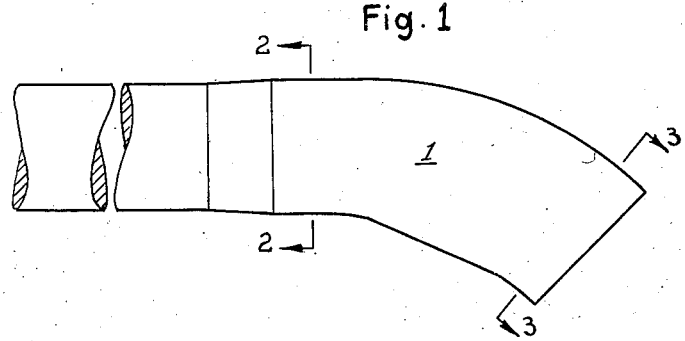
Figure 2:
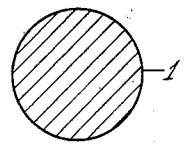
Figure 3:
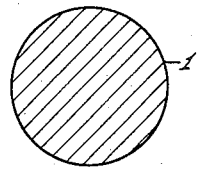

Figure 16, which corresponds generally to Figure 3, is a section of the oval portion of the curved mandrel;

Figure 17, is a side view showing the straight stock of standard circular cross section in dotted lines as it appears before the mandrel operation and the intermediately curved stock of large oval cross section, in full lines as it appears after the mandrel operation, the plane of the bend of the intermediately curved stock being vertical;

Figure 18 is a section taken along line 18—18 of Figure 17;

SECOND OPERATION

Figures 19 and 20 are vertical sectional views respectively taken longitudinally and transversely through the center of the dies used to perform the second operation, the dies being shown in the position at which they first engage the intermediately curved oval stock;

Figure 21 shows the dies in the position which they assume when brought together to perform the second operation; and Figure 22, is a sectional view showing the intermediately curved stock, of large oval cross section, in dotted lines as it appears before the second operation and the finally curved fitting of standard circular cross section, in full lines as it appears after the second operation.

In carrying out both methods, I utilize straight pipe stock of standard size for making a fitting of the same standard size. For example, a standard fitting of 2″ nominal pipe size and the standard straight pipe stock of standard size for it have the following approximate dimensions:

|    | straight stock | curved fitting |
|----|---|---|
|    | Inches | Inches |
| OD | 2.375 | 2.375 |
| ID | 2.067 | 2.067 |
| WT | .154 | .154 |
| RC | Infinite | 3.000 |

For the sake of clarity in presenting this invention, the foregoing pipe sizes shall be used throughout the description.

FIRST OR PREFERRED METHOD

In carrying out this method, I employ a curved expansion mandrel 1 of conventional structure except that it ultimately curves along an arc having a radius equal approximately to 2½ times the nominal pipe size of the fitting instead of the conventional radius of 1½ times such nominal pipe size. With a nominal pipe size of 2", the radius of the mandrel 1 will approximate 5". This radius may be varied somewhat but, whatever radius is employed, it should be such that when welded stock is forced over the mandrel it will not weaken or separate along the seam.

*First operation*

Figure 4:
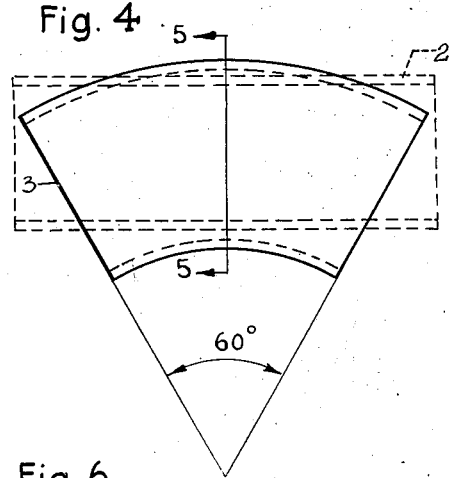
Figure 4 is a side view showing the straight stock of standard circular cross section in dotted lines as it appears before the mandrel operation and the curved stock of large circular cross section in full lines as it appears after the mandrel operation, the plane of the bend in the curved stock being vertical.
Figure 5:
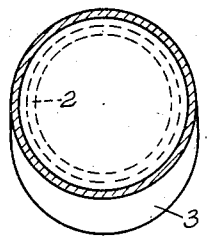
Figure 5 is a section taken along 5—5 of Figure 4.

With an expansion mandrel of this character, the standard 2" straight stock, indicated at 2 in Figures 4 and 5, when conventionally heated and then passed over the mandrel will be bent or shaped to an intermediate curvature of 5" instead of a final curvature of 3". In passing the stock 2 over the mandrel 1 it is expanded approximately 20% to a large circular cross section having an OD approximating 2.840" and an ID approximating 2.532". During this operation, it will be understood that the length of the curved stock along the outside of its bend and in the plane of its bend will remain the same as the length of the straight stock 2 whereas the length of the intermediately curved stock 3 along the inside of the bend will be shortened causing sufficient metal to flow around the stock as to maintain the same wall thickness within allowable tolerance. The intermediately curved stock 3 of large circular cross section, as it appears after the mandrel operation, is shown in Figures 4 and 5.

*Second operation*

The intermediately curved stock of large circular cross section is now placed between a pair of upper and lower dies 4 and 5, with the plane of its bend vertically arranged, and simultaneously bent and compressed in the plane of its bend to form the finally curved stock 6. In the bending operation, the stock is bent or shaped to the final 3" curvature. At the same time it is compressed to an oval cross section having its major axis, which is at right angles to the plane of the bend, remain approximately equal to the diameter of the intermediately curved stock 3 of large circular cross section, and its minor axis, which is in the plane of the bend, compressed and flattened to the OD and ID of the standard stock and fitting. In this operation, the length of the stock along the outer side of the bend is slightly lengthened while the length on the inner side and the wall thickness remain approximately the same. During this operation, the dies subject a considerable area of the curved stock to the beneficial effects of compression and, at the same time, they correct any lead end distortion occurring during the mandrel expansion operation thus avoiding the necessity of a special operation to correct such distortion. The finally curved stock 6 of oval cross section is illustrated in Figures 8–10.

*Third operation*

The finally curved stock 6 of oval cross section is now placed between a pair of upper and lower dies 7 and 8 with the plane of its bend horizontally arranged and the major axis of its oval cross section vertically arranged. The oval stock 6 is compressed by the dies 7 and 8 from its oval cross section to the standard circular cross section of the final fitting 9. In this operation the stock may again be slightly lengthened but again it undergoes the beneficial effects of compression so that the finally curved fitting 9 of standard size is of maximum strength.

SECOND METHOD

In carrying out this method, I employ a curved expansion mandrel 10 of conventional structure except first that it ultimately curves along an arc having a radius equal approximately to 2½ times the nominal pipe size of the fitting and second that it has an oval cross section, the major axis of which is in the plane of the bend and the minor axis at right angles thereto.

*First operation*

The standard 2" straight stock indicated at 2 in Figures 17 and 18 is passed over the mandrel 10 and simultaneously bent or shaped to an intermediate curvature having a 5" radius and expanded to an oval cross section having its major axis, which is in the plane of the bend, expanded approximately 20% and its minor axis, which is at right angles to the plane of the bend, maintained to the OD and ID of the standard stock and fitting. The intermediately curved stock of oval cross section is indicated at 11 in Figures 17–20.

*Second operation*

The intermediately curved stock 11 of oval cross section is now placed between a pair of upper and lower dies 12 and 13, with the plane of its bend vertically arranged and simultaneously bent or shaped to the final 3" curvature and compressed to the circular cross section of the standard stock and fitting to form the final fitting 14. In this process the stock is beneficially compressed longitudinally in the first and second operations and cross sectionally in the second operation. At the same time, the second operation corrects any lead end distortion occurring during the first operation.

My methods have the advantage of utilizing stock of either standard size or any special size in making fittings of the same size. This is particularly important in low volume production, such as often occurs where special fittings made of some special metal such as stainless steel or of some special size are desired, because it avoids the necessity of securing special undersized stock. Another advantage lies in the fact that, due to the use of a mandrel, which is intermediately curved, the stock can be forced over the mandrel at a higher speed than has been employed heretofore. Furthermore small distortions and defects which are occasioned when the stock is forced over the mandrel at relatively high speeds will normally be corrected in the die operations. Finally the extensive area of the fitting which undergoes compression during the practice of my methods results in a fitting of increased strength. In this connection, it may be noted that in all operations where the stock is slightly lengthened, it is not weakened because it simultaneously undergoes compression.

Having described my invention, I claim:

1. A process of making pipe fittings, such as elbows and the like of predetermined longitudinal curvature from straight circular cross sectional stock of substantially the same size as the fitting comprising: bending the straight stock longitudinally to an intermediate curvature; processing it to an enlarged oval cross section having a minor axis approximating the diameter of the straight stock and final curved fitting; bending the intermediately curved stock to said predetermined longitudinal curvature of the final fitting; and compressing the enlarged oval stock to a circular cross section having a diameter closely approximating the diameter of the original stock and of the final fitting to form such fitting.

2. The process of making pipe fittings, such as elbows and the like of one size and predetermined longitudinal curvature from straight stock of substantially the same size comprising: passing the stock over an expansion mandrel to bend it to an intermediate curvature and simultaneously expand it to a circular cross sectional area of greater area than the circular cross section of the original stock; bending the stock to the final curvature and simultaneously compressing it in one direction to an oval cross section, the minor axis of which is located in the plane of the bend and reduced to the diameter of the standard stock; and then compressing the curved oval shaped stock to the circular cross sectional area desired in the final fitting.

3. The process of making pipe fittings, such as elbows and the like of one size and longitudinal curvature from straight stock of substantially the same size comprising: bending the stock longitudinally to an intermediate curvature and simultaneously expanding it to an oval cross section, the minor axis of which is perpendicular to the plane of the bend and equal approximately to the diameter of the original stock; and bending the intermediately curved stock longitudinally to the final curvature and simultaneously compressing it to a circular cross section of substantially the same size as the original stock.

RUDOLPH E. FRITSCH.

REFERENCES CITED

The following references are of record in the file of this patent:

FOREIGN PATENTS

| Number | Country | Date |
|---|---|---|
| 573,890 | Germany | 1933 |